US006982989B2

(12) United States Patent
Park et al.

(10) Patent No.: US 6,982,989 B2
(45) Date of Patent: Jan. 3, 2006

(54) TRANSMISSION OF DATA FRAMES USING LOW-OVERHEAD ENCAPSULATION AND MULTIPLE VIRTUAL TRIBUTARIES IN A SYNCHRONOUS OPTICAL NETWORK

(75) Inventors: Jae Park, Congers, NY (US); Roy McNeil, Warwick, NY (US); David Delgadillo, Plano, TX (US)

(73) Assignee: Fujitsu Limited, Kanagawa-ken (JP)

( * ) Notice: Subject to any disclaimer, the term of this patent is extended or adjusted under 35 U.S.C. 154(b) by 880 days.

(21) Appl. No.: 09/878,723

(22) Filed: Jun. 11, 2001

(65) Prior Publication Data

US 2002/0196811 A1    Dec. 26, 2002

(51) Int. Cl.
*H04J 3/22*    (2006.01)
*H04J 3/24*    (2006.01)

(52) U.S. Cl. .................................. 370/471; 370/474

(58) Field of Classification Search .............. 370/476, 370/477, 471, 473, 474, 395.5, 395.52, 355, 370/400, 403, 404, 409

See application file for complete search history.

(56) References Cited

U.S. PATENT DOCUMENTS

| 6,356,544 B1 * | 3/2002 | O'Connor .................... 370/353 |
| 6,389,030 B1 * | 5/2002 | Coden ......................... 370/404 |
| 6,678,474 B1 * | 1/2004 | Masuda et al. ................ 398/75 |
| 6,771,663 B1 * | 8/2004 | Jha .............................. 370/473 |
| 6,785,285 B1 * | 8/2004 | Romana et al. ......... 370/395.51 |
| 6,819,679 B1 * | 11/2004 | Kerns et al. ................. 370/474 |
| 2001/0036185 A1 * | 11/2001 | Dempo ....................... 370/392 |

OTHER PUBLICATIONS

IEC, Web ProForum Tutorials, "Synchronous Optical Network (SONET)", date unknown.
IETF Network Working Group, RFC 1717, The PPP Multilink Protocol (MP), Nov. 1994.
IETF Network Working Group, RFC 1661, "The Point-to-Point Protocol (PPP)", Jul. 1994.
IETF Network Working Group, RFC 2892, "The Cisco SRP MAC Layer Protocol", Aug. 2000.
Enrique Hernandez-Valencia, "GFP Draft Specification—Revision 2", Lucent Technologies, Jan. 2001.
IETF, RFC 2026, "A Framework for IP over Resilient Packet Rings" Dec. 2000.

* cited by examiner

*Primary Examiner*—Andy Lee
(74) *Attorney, Agent, or Firm*—Weingarten, Schurgin, Gagnebin & Lebovici LLP

(57) ABSTRACT

A network device transfers variable-length data frames across a synchronous network employing a multiple-channel synchronous transport signal. Encapsulation logic encapsulates each data frame in a point-to-point frame including a body portion of the data frame and a length value located in a beginning portion of the point-to-point frame. Segmentation logic divides each point-to-point frame into fixed-sized segments, a first segment carrying the beginning portion of the point-to-point frame. Transmitting circuitry transmits the frame segments as payloads of at least one channel of the synchronous transport signal, the payloads being marked so as to be identifiable. Receiving circuitry receives payloads of at least one channel of the synchronous transport signal and from each received set of payloads regenerates a corresponding point-to-point frame using the length value from the first segment thereof. De-capsulation logic de-capsulates each regenerated point-to-point frame to recover the corresponding data frame.

33 Claims, 8 Drawing Sheets

TRANSMISSION OF DATA FRAMES USING LOW-OVERHEAD ENCAPSULATION AND MULTIPLE VIRTUAL TRIBUTARIES IN A SYNCHRONOUS OPTICAL NETWORK

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications, and more particularly to the transmission of local area network data traffic through a synchronous communications network.

Traditional data communications among computers has been carried out using local-area networks (LANs). Ethernet LANs, for example, have been very widely used in the data communications field. Generally, data communication over LANs has employed data units or "packets" having a variable size. Explicit address information is included in a header portion of each packet to identify the recipient. Specialized control logic at the various nodes of a network are responsible for detecting incoming packets, temporarily storing them in variable-size buffers, and determining from the address information which node or nodes the packet is destined for.

As LAN technology has developed, there has also been development in the technologies used in traditional telephony communications. Pulse code modulation (PCM) of voice signals and synchronous time-division multiplexed (TDM) transmission channels have been in use for many years. With advances in optical fiber technology, communications carriers have devised very high data rate signals for fiber optic transmission that carry thousands of individual TDM channels using hierarchical TDM techniques. In particular, a set of standardized synchronous transport signals (STSs) are utilized in networks that adhere to Synchronous Optical Network (SONET) standards. Synchronous digital signals having data rates ranging from about 51 Mb/s to over 100 Gb/s are defined in SONET, each signal generally incorporating an integer number of basic "STS-1" signals.

There has been increasing interest in and need for communications equipment that can interface with traditional and emerging LANs, on the one hand, and the high-speed synchronous communications networks of the type traditionally deployed in telephony communications. The telephony networks, for example, are used for inter-LAN communications in wide-area networks (WANs), and therefore special interfaces are required to translate between LAN hardware and protocols and the hardware and protocols of the synchronous networks. Additionally, SONET-compliant equipment has been incorporated into portions of private and semi-private networks where the expense of such equipment is justified by the performance it provides, for example in backbone segments that are required to carry very high volumes of data traffic.

In these hybrid networks, there has been increased use of techniques that can be classified as "LAN emulation". In a typical application, two or more disjoint LAN segments, for example segments residing in different buildings, are connected by one or more high-speed network segments of the type traditionally used in longer-haul networks such as the telephony networks. For example, one or more fiber optic links carrying SONET traffic may be used for such a high-speed link. The equipment that interfaces the separate LAN segments to the high-speed segments operates such that the collection of separate LAN segments appear to the connected host computers as a single LAN. This type of operation has numerous benefits, including the protection of investments in LAN hardware and software while providing greater connectivity and network capacity than would be possible using LAN technology alone.

In some networks of the type described above, the high-speed segments may provide data transport services to a number of different sets of users. For example, different businesses within a building or complex may utilize the high-speed network. There may be several independent emulated LANs, for example, that share the use of the high-speed network. In such cases, it may be necessary to allocate the usable capacity or bandwidth of the high-speed network among these multiple entities, to ensure that each enjoys a specified capacity without regard to the use of the network by the other entities.

Another issue to be addressed in networks of the foregoing type is the manner in which data traffic should be carried. The synchronous signals in the high-speed network are typically organized into fixed-size frames. The signal may retain a TDM aspect, in which case there must be a conversion between the connected LANs and discrete channels of the signal. In some cases, some part or all of the synchronous signal may have a "concatenated" format, meaning that the boundaries that typically exist among discrete TDM channels are not present, and the signal can be treated as a single fixed-rate stream available to carry data traffic. An example of such a signal is an Optical Carrier 3c, or OC-3c, which is a 155 Mb/s signal having no TDM sub-structure.

Protocols, such as High-Level Data Link Control (HDLC), have been used to transmit variable-length frames in an otherwise undifferentiated signal such as an OC-3c signal. Like other framing protocols, HDLC employs special "escape" characters and "escape sequences" that convey signaling information such as frame boundaries. One problem with such techniques is that the pattern of the escape character generally occurs in the data stream being framed, and if transmitted without modification would be erroneously interpreted as an escape character. To deal with this situation, a technique called "character stuffing" is used. Basically, every occurrence of the escape character in the data stream is replaced with a multi-character escape sequence that signifies that the receiver should insert the pattern of the escape character in the received data stream.

One significant drawback of employing HDLC or similar framing is the unpredictable expansion of the data rate that results from character stuffing. If a user data signal is specified to have a given fixed rate, for example, then the rate in the network is increased in proportion to the rate at which the escape character pattern appears in the data. Although on average such expansion may be very small, there may be realistic worst-case patterns that can result in expansion of 10% or more for non-negligible periods of time. If bandwidth is allocated based on such worst-case traffic, the link is generally under-utilized, which is inefficient. If bandwidth allocation is based on average traffic, then there may be an unacceptable rate of traffic loss when worst-case data patterns occur.

A number of links have been used to carry a single stream of packets or LAN frames. The stream is divided into separate logical channels, each of which is carried over a corresponding link. This technique has the effect of providing a desired overall transmission capacity by employing a number of lower-capacity links. Systems employing such techniques are generally referred to as "multilink" systems. It is generally necessary to append control information to the data transmitted over each link to enable a receiver to reconstruct the original data stream. On each link, it is necessary to frame or otherwise delineate the data and control information just as in the case of non-multilink transmission. When HDLC or similar framing is employed, the above-described problem of excessive rate expansion may exist.

BRIEF SUMMARY OF THE INVENTION

In accordance with the present invention, methods and apparatus for transmitting data frames in a synchronous network are disclosed. Low-overhead encapsulation of the data frames is used along with multi-link transmission to obtain flexible allocation and efficient use of transmission bandwidth without incurring the unpredictable rate expansion of HDLC or similar framing protocols.

Variable-length data frames, such as from a local-area network, are transferred across a synchronous network employing a multiple-channel synchronous transport signal, wherein each channel of the synchronous transport signal carries data in fixed-size payloads. The channels may be virtual tributaries (VTs) of a SONET STS signal, for example, which carry 24-byte payloads. The data frames are first encapsulated in corresponding point-to-point frames, each including a body portion of the corresponding data frame and a length value. Preferably, the length value is located at a predetermined position in a beginning portion of the point-to-point frame. Each point-to-point frame is divided into a set of fixed-sized segments. The segments of each point-to-point frame are transmitted as payloads of at least one channel of the synchronous transport signal. When SONET VTs are utilized, the payloads are carried as VT synchronous payload envelopes (SPEs). The payloads are marked so as to be identifiable in a stream of payloads in the channel or channels of the synchronous transport signal.

Sets of payloads of the channel(s) are received by a receiver, and from each received set of payloads the corresponding point-to-point frame is regenerated based at least in part on the length value included in the first segment. That is, the length value helps the receiver identify the last data unit of the point-to-point frame within the segment carrying the last part of the point-to-point frame. The regenerated point-to-point frames are then de-capsulated to recover the corresponding data frames.

By using encapsulation and an explicit length value, the rate variability of HDLC and similar character-stuffing protocols is avoided, while relatively low overhead is retained for efficient use of transmission bandwidth.

In one transmission scheme, the synchronous network is used by multiple users, such as multiple LAN bridges or bridge groups. The channels of the synchronous transport signal are grouped or "bundled", and each bundle is used to carry the data frames of a different set of network users. Each distinct point-to-point frame is carried on only a single channel of a bundle, and a load balancing process is employed to distribute the frames of the users across all the channels of each bundle so as to minimize delay differences, or dispersion, through the synchronous network. Resequencing logic is used within the receivers to re-order received frames as necessary to recover the original frame ordering.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
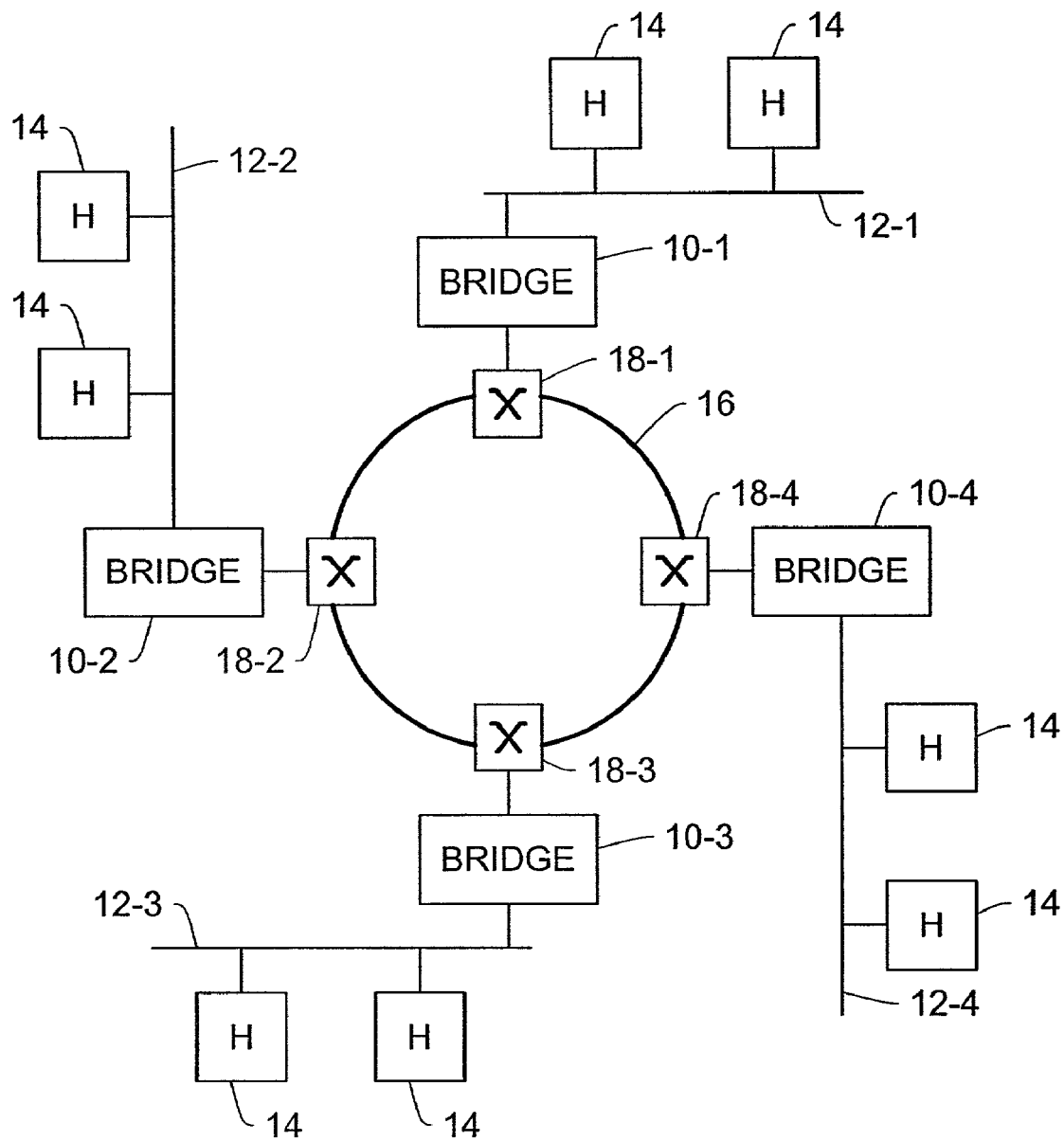
FIG. 1 is a generalized block diagram of a network having a Synchronous Optical Network (SONET) ring providing transport of data frames among multiple local area network (LAN) bridges in accordance with the present invention.

In FIG. 1, bridges 10-1 through 10-4 are connected to corresponding local area network (LAN) segments 12-1 through 12-4. Each LAN segment 12 has one or more host computers 14 or similar nodes connected to it. The bridges 10 are coupled to a Synchronous Optical Network (SONET) ring 16 via respective SONET termination and add-drop circuitry 18. The SONET ring 16 and add/drop circuitry 18 provide data frame transport services to the bridges 10 such that the set of LAN segments 12 collectively appear as a single LAN from the perspective of any of the hosts 14. That is, a host 14 communicates with another host 14 residing on a different LAN segment 12 in the same manner as if the other host 14 resided on the same LAN segment 12. The bridges 10 and add/drop circuitry 18 perform frame forwarding and filtering on behalf of the LAN segments 12 to achieve this logical joining of the LAN segments 12 into a single LAN.

The hosts 14 on each LAN segment 12 communicate using any of a variety of LAN protocols. Such protocols typically employ data "packets" or "frames" that are transmitted non-synchronously. Although all the hosts 14 on a segment 12 use the same raw signaling rate, such as 10 Mb/s for example, their respective clocks are generally not synchronized. Additionally, the time periods in which each host 14 transmits are not fixed, but rather are decided dynamically according to some type of selection process. The frame sizes may be fixed or variable, and each frame typically includes one or more addresses indicating the destination(s) of the frame. For the sake of specificity in this description, it is assumed in the following description that the LAN segments 12 employ the Ethernet communications protocol.

When a bridge 10 receives a frame from a LAN segment 12, it is responsible for determining whether the destination host 14 identified in the frame resides on another LAN segment 12, and if so then forwarding the frame to the corresponding bridge 10 via the SONET ring 16. Thus, if bridge 10-1 receives a frame from LAN segment 12-1 that is destined for a host 14 on LAN segment 12-4, bridge 10-1 forwards this frame to bridge 10-4. A bridge 10 receiving a frame from the SONET ring 16 is responsible for determining whether the frame is to be transmitted on the LAN segment 12 to which the bridge 10 is connected, and if so then taking such action. Continuing with the above example, bridge 10-4 transmits the frame received from bridge 10-1 on the LAN segment 12-4 for delivery to the destination host 14. As described below, there are a variety of ways in which this general operational scheme can be carried out.

In FIG. 1, each bridge 10-1 through 10-4 is a member of a single "bridge group" defined in the system. Although not shown in FIG. 1, there may be additional, independent bridge groups that rely on the transport services of the SONET ring 16 for exchanging their traffic. Such additional bridge groups may have separate connections to the ring 16 or may share the connections used by the bridges 10-1 through 10-4. The bridges of different groups do not exchange LAN frames. Different bridge groups may be associated with different customers of a SONET transport provider, for example, or may form different sub-networks in a larger network of a single organization.

Data traffic on the SONET ring 16 is carried in time-division multiplexed (TDM) fashion in units referred to as Synchronous Transport Signals (STSs). There are several standard STSs that have a hierarchical relationship with respect to each other. The basic or lowest-rate STS is known as STS-1 and has a specified bit rate of approximately 51 Mb/s. An STS-1 frame can be described as a 9-row by 90-column array of 810 bytes or "octets". Different types of overhead information occupy several predetermined columns, and the remaining columns contain a data payload. There are also several higher-level STSs, such as STS-3, STS-12, and STS-48, for example. Each of these higher-level STSs is formed by multiplexing a number of STS-1 signals together, and has a bit rate substantially equal to the corresponding multiple of the STS-1 bit rate. The following description focuses on the use of a single STS-1 in the SONET ring 16 to carry LAN traffic among the bridges 10. It will be appreciated that the techniques described herein can be extended to systems employing higher-level STS signals.

In addition to the aggregation of STS-1 signals into higher-level STS signals, there are standard ways in which an STS-1 can be subdivided into multiple lower-capacity channels. One of these is the use of virtual tributaries (VTs). When carrying a VT-structured payload, an STS-1 carries 7 VT groups, with each group using a corresponding set of 12 columns of the STS-1 payload. Each group can be structured in one of four ways as follows:

4 "VT 1.5" signals, each 1.7 Mb/s and using 3 columns
3 "VT 2" signals, each 2.3 Mb/s and using 4 columns
2 "VT 3" signals, each 3.5 Mb/s and using 6 columns
1 "VT 6" signal, 6.9 Mb/s and using all 12 columns In general, different groups in the same STS-1 signal can be structured differently. For example, there may be 3 groups using VT 1.5 structuring and 3 groups using VT 6 structuring. As described below, the presently disclosed system employs 7 groups of VT 1.5 signals, for a total of 28 VT 1.5s in the STS-1 payload. These VTs are selectively allocated to carry the traffic of different bridges and/or bridge groups. The use of VT 1.5 signals provides finer control over the allocation of transport bandwidth than if larger-capacity VTs were used. It will be appreciated that other structures for an STS-1 signal carrying LAN traffic may be advantageously employed in alternative embodiments.

The VTs can be allocated to carry the inter-bridge LAN traffic in any of a variety of ways. One useful abstraction in an allocation scheme is that of a VT "bundle", or a set of VTs allocated to the same logical connection in the ring 16. If traffic between two bridges 10, for example, is expected to require 5 Mb/s of transport bandwidth, a bundle of 3 VT 1.5s can be defined to carry this traffic. This bundle is separate from other bundles that may carry traffic for other bridges in the same or different bridge groups. The number of bundles used in any particular system depends on a variety of factors, including the number of bridge groups, the number of bridges sharing each bundle, etc. Preferably there is software control over the creation and definition of the VT bundles as well as the assignment of individual VTs to the VT bundles, to provide desirable system flexibility.

Figure 2:
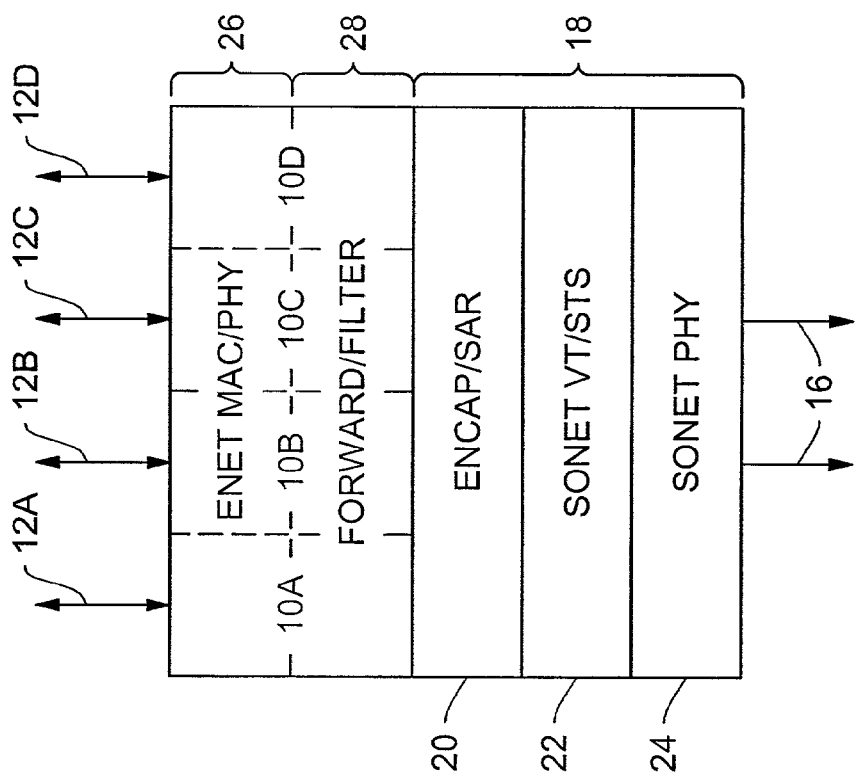
FIG. 2 is a diagram depicting a layered partitioning of processing for transporting frames in the network of FIG. 1.

FIG. 2 generally illustrates the multi-layer processing that occurs at each node of the ring 16. In the illustrated embodiment, each node includes separate bridges 10A–10D to support four independent local LAN segments 12A–12D. The four bridges 10A–10D share the use of the SONET termination and add/drop circuitry 18, which is shown to include ENCAP/SAR logic 20, VT/STS logic 22 and SONET physical layer (PHY) circuitry 24. The ENCAP/SAR logic 20 performs frame encapsulation, decapsulation, segmentation and reassembly, which are described below. Each bridge 10A–10D includes Ethernet media access control/physical layer (MAC/PHY) circuitry 26 and forwarding/filtering logic 28.

When an Ethernet frame is received from a LAN segment 12 by the corresponding MAC/PHY circuitry 26, it is first processed by forwarding/filter logic 28 to determine whether the destination address indicates that the frame is to be forwarded on the ring 16. This is the case, for example, when the frame is a unicast frame and the destination is known to reside on a remote LAN segment 12 (i.e., a LAN segment 12 attached to another node of the ring 16), or when the frame is a multicast frame or has an unknown destination and therefore must be multicast to one or more remote LAN segments 12. If the frame is to be forwarded on the ring 16, it is provided to the ENCAP/SAR logic 20, which encapsulates the Ethernet frame in a format described below. The encapsulated frame is then divided into segments (or "segmented"), and the segments are provided to the VT/STS logic 22 to be carried over the ring 16 in VT payloads, also described further below. The VT/STS logic 22 incorporates the segments as VT payloads of one or more VTs and STS-1 frames, and the VTs and STS-1 frames are provided to the SONET PHY circuitry 24 for transmission on an outgoing segment of the ring 16.

On the receive side, the optical signal from the ring 16 is received by the SONET PHY circuitry 24 and converted into a corresponding serial electrical data signal. The VT/STS logic 22 identifies the STS-1 frames in this signal and performs various STS overhead processing tasks. Additionally, the VT/STS logic 22 may utilize SONET functionality referred to as "drop and continue" to route received frames to the ENCAP/SAR logic 20 (a local "drop") and to the next node in the ring 16 (a "continue"). The drop and continue functionality is used with a "full multicast" connectivity scheme employed in the ring to create connections among the bridges 10, as described below.

For dropped SONET traffic, the VT/STS logic 22 recovers the individual VT payloads and provides them to the ENCAP/SAR logic 20, where they are reassembled into encapsulated Ethernet frames. The ENCAP/SAR logic 20 may implement functions in support of a "shared VT" connectivity scheme that is an alternative way of creating connections among the bridges 10, as described further below. Reassembled frames are de-capsulated and provided to the forwarding/filtering logic 28. If the frame is to be forwarded to one of the segments 12A–12D attached to the receiving node, the frame is provided to the MAC/PHY circuitry 26 for such purpose.

The VT/STS logic 22 carries out SONET line-layer and section-layer functions, including framing, performance monitoring, protection switching, and inserting/extracting the SONET synchronous payload envelope (SPE). The VT/STS logic 22 also processes VT overhead and includes 28 circuits (not shown) that operate in parallel on the 28 separate VT 1.5 signals in the SONET SPE. Each of these circuits performs VT path and transport functions, including VT framing, VT performance monitoring, VT signal label checking, and inserting/extracting the VT SPE. Data from received VT SPEs is passed to the ENCAP/SAR logic 20 via local receive buffers (described below; not shown in FIG. 2), and outgoing data from local transmit buffers (not shown) is used to generate outgoing VT SPEs.

Figure 3:
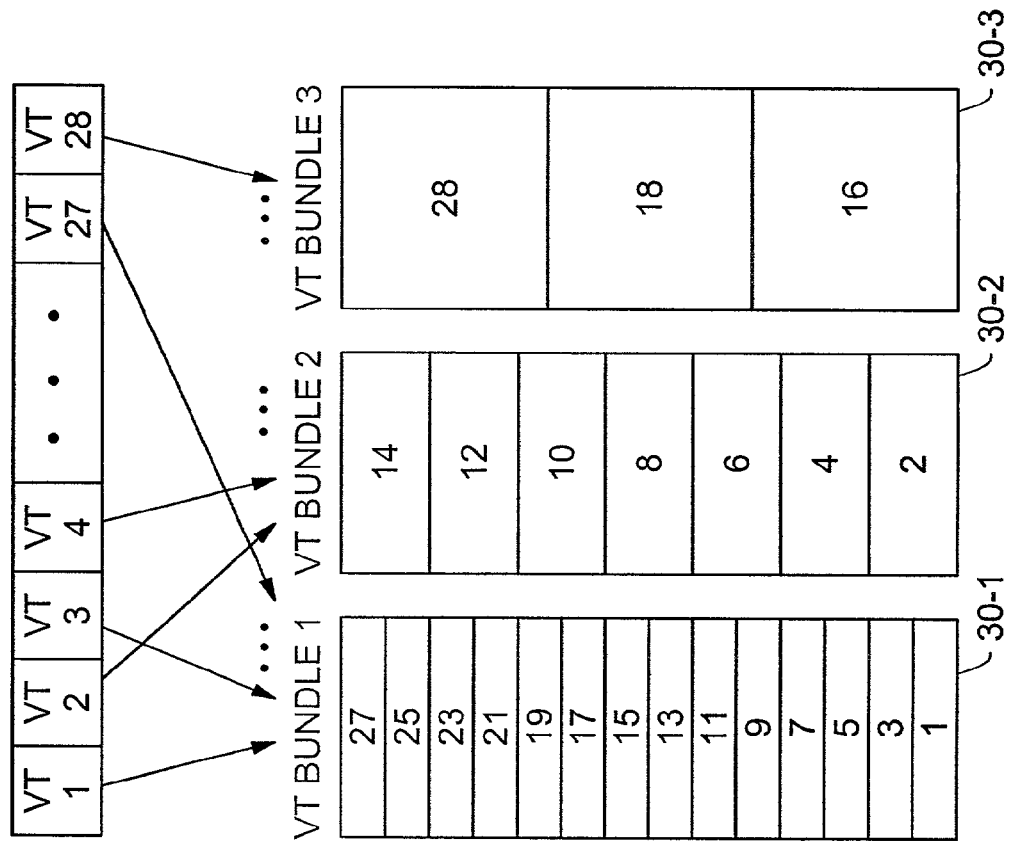
FIG. 3 illustrates the use of multiple bundles of SONET virtual tributaries (VTs) for LAN traffic transport in the SONET ring of FIG. 1.

FIG. 3 shows one example of the use of VT bundles. Three bundles 30 are defined. VT bundle 30-1 includes the fourteen odd-numbered VTs in the set of twenty-eight total. VT bundle 30-2 includes the even VTs in the range from #2 through #14, and VT bundle 30-3 includes VTs #16, #18 and #28. VTs #20, #22, #24, #26 are not used. By virtue of the illustrated bundling scheme, the bridge(s) to which VT bundle 30-1 is assigned is/are allocated one half the total STS-1 payload bandwidth. The bridges to which VT bundles 30-2 and 30-3 are assigned are allocated one quarter and three twenty-eighths, respectively, of the STS-1 payload bandwidth.

Figure 4:
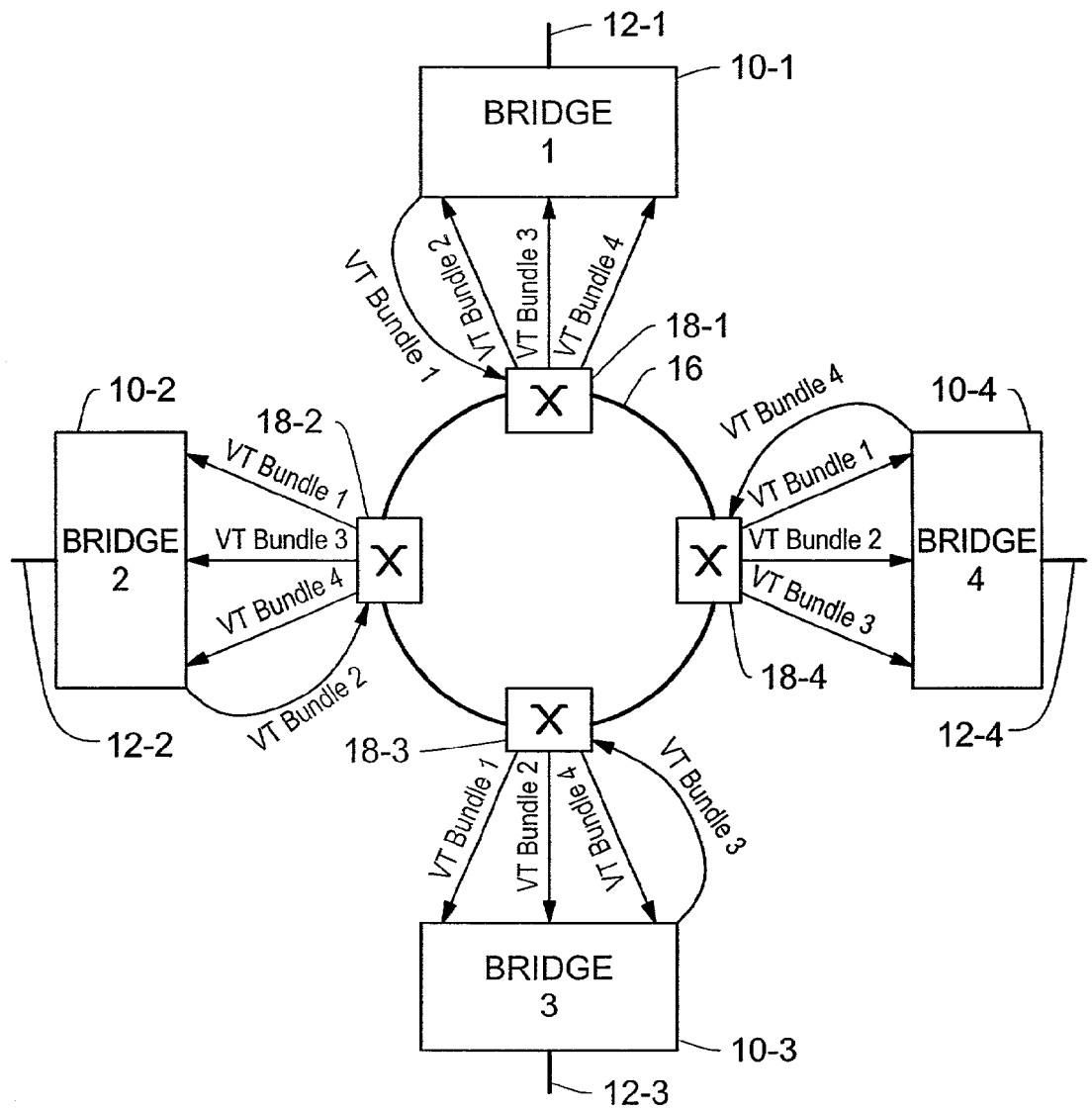
FIG. 4 is a block diagram of a version of the network of FIG. 1 employing full multicast connectivity to transport data frames among the LAN bridges.

FIG. 4 shows one arrangement for using VTs and VT bundles to carry the inter-bridge LAN traffic of a bridge group. In this arrangement, referred to as "full multicast connectivity", different VT bundles are used to carry LAN traffic sourced by different bridges in a bridge group, and every VT bundle is received by all other bridges in the bridge group. Thus, in FIG. 4, VT bundle "x" carries the traffic sourced by bridge "x" (for "x" from 1–4). Each bundle is always available to the corresponding source bridge 10 for carrying data. Any number of the bridges 10 in a group can therefore transmit simultaneously without mutual interference. As in the example of FIG. 3, different bridge groups may have different-sized bundles, and therefore have different allocations of bandwidth in the ring 16.

In the full multicast scheme, the SONET termination and add-drop circuitry 18 at each node provides certain VT routing functionality as follows:

1. Receives VT bundles from the local bridge(s) and inserts the VTs of this bundle into an "outgoing" STS-1 being transmitted to the next node in the ring 16. This operation is referred to as an "add" operation.
2. Receives VT bundles from the other bridges of the bridge group via an "incoming" STS-1 from the previous node in the ring 16, and (i) provides the received VT bundles as input to the local bridge 10, and (ii) sends the received VT bundles to the next node via the outgoing STS-1. This operation is referred to as "drop and continue". Different nodes may perform different combinations of drop and continue functions. For example, if there is no local bridge that is a member of a bridge group for a VT bundle, then the traffic is only "continued" by the add/drop circuitry 18. If the local bridge is the last bridge in the ring that is a member of the bridge group, then the traffic is only "dropped" and not continued. The functions to be performed at each node are established by provisioning.

By the above mechanism, every bridge 10 receives the LAN traffic generated by all other bridges 10 in the same bridge group. In particular, the traffic from any given source bridge 10 is transmitted on a VT bundle uniquely associated with that source bridge 10. Each set of add/drop circuitry 18 identifies the source of incoming traffic based on the identities of the VTs carrying the traffic. Locally generated traffic is simply placed on the VT bundle associated with the local bridge 10. Traffic on VT bundles associated with other bridges 10 is dropped locally and also continued via the outgoing STS-1.

The number of VTs available in the SONET ring 16 establishes certain configuration constraints when the full multicast technique is employed. In particular, there are bounds on the number of bridges allowed in a bridge group, the number of bridge groups, and the amount of bandwidth (in increments of VT 1.5) allocated to each full multicast channel. For example, if it is assumed for simplicity that all bridge groups are similar to each other in terms of the maximum number of bridges, the number of VTs allocated per bridge, and the type of VTs used, then the following relationship must hold:

[(# groups)×(# bridges per group)×(# VTs per bridge)]
≦total number of VTs available to carry bridge traffic Thus, when there are 28 VT 1.5s available, for example, a configuration such as (7 groups, 2 bridges/group, 2 VT 1.5s per bridge) is legal, whereas (5 groups, 3 bridges/group, 2 VT 1.5s per bridge) is illegal. In general, there is no requirement that all bridge groups be so similar, and therefore the general constraint is simply that the sum of all VTs, regardless of how they are allocated to bridges or groups, must be no greater than the total number of available VTs.

The full multicast connectivity scheme is well suited to carry multicast or broadcast messages, which are used in a variety of contexts to distribute messages to a number of different recipients in a LAN. The full multicast scheme can also be used to carry unicast traffic. Preferably, each bridge 10 employs a filter between the SONET ring 16 and the local LAN segment 12 to avoid unnecessarily transmitting frames on the local segment 12 that are destined for a host 14 residing on a different LAN segment 12. Each bridge 10 maintains a list of network addresses of hosts 14 that are known to the bridge 10, and each address is associated with the LAN segment 12 to which the corresponding host 14 is attached. Each bridge 10 compares the destination addresses of received frames to the addresses in the list. If the address is known and the destination host resides on the local LAN segment 12, the frame is transmitted on the local LAN segment 12 to be received by the destination host 14. If the address is unknown, then the frame is forwarded to the local LAN segment 12. If the address is known but the destination host resides on another LAN segment 12, the bridge 10 simply drops the frame.

Figure 5:
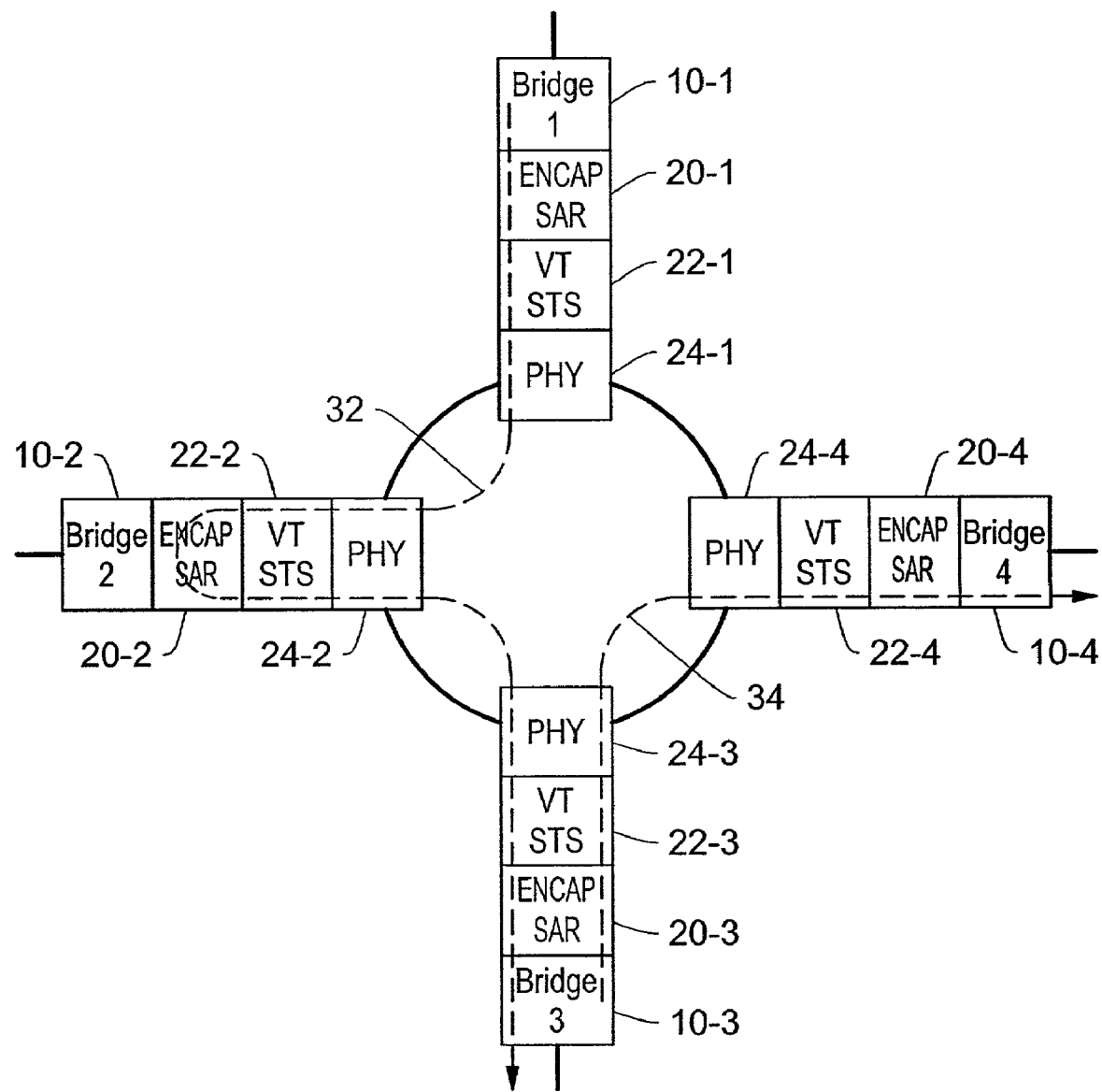
FIG. 5 is a block diagram of a version of the network of FIG. 1 employing shared VT connectivity to transport data frames among the bridges.

FIG. 5 shows an alternative method of allocating the VTs in the ring 16 to carry the LAN traffic of the different bridges 10. In this scheme, which is referred to as "shared VT connectivity", VT bundles are associated with respective bridge groups, rather than with particular source bridges, and the bridges of each bridge group share the use of the respective VT bundle.

FIG. 5 shows an example of the use of a single VT bundle by multiple bridges 10 of the same bridge group. A unicast frame is sent from bridge 10-1 to bridge 10-3 along a two-hop path 32, and a separate unicast frame is sent from bridge 10-3 to bridge 10-4 along a one-hop path 34. Each node transmits on one or more VTs of the same VT bundle. At each node, scheduling logic (discussed below; not shown in FIG. 5) for the bridge group is responsible for allocating the use of the VT bundle. One major function of the scheduling logic at each node is to determine at periodic scheduling intervals whether the outgoing VTs are to carry frames originated by the local bridge 10 or frames originated by bridges 10 residing at other nodes of the ring 16. Examples of the latter include the frames received on path 32 at node #2 (i.e., the node including bridge 10-2). At node #3, the scheduling logic is free to use the same VTs for the frames on path 34 as are being used for the frames on path 32, because the frames on path 32 are not being sent further in the ring 16.

The shared connectivity model of FIG. 5 requires the use of a scheduler to allocate the use of the ring 16 among the bridges of a bridge group. A scheduler can be implemented using a table of "slots" and sequencing logic that uses information in the slots to make moment-by-moment scheduling decisions. For example, a scheduling table for a bridge group may be configured as follows:

| Bridge | Allocation | Internal/External |
|--------|------------|-------------------|
| 1 | 2000 | 2000/9500 |
| 2 | 2500 | 2500/9000 |
| 3 | 3000 | 3000/8500 |
| 4 | 4000 | 4000/7500 |

The data in the "Allocation" column signifies that for every scheduling cycle, bridge 1 is allowed to transmit up to 2000 bytes; bridge 2 up to 2500, etc. Each bridge does not require all of the allocation information in the table. The scheduler at any given bridge needs only the allocation for that bridge and the total allocation to all other bridges. The information available at each bridge is shown in the "Internal/External" column of the above table. Bridge 1, for example, is provided with an "Internal" number of 2000 (which is the allocation to bridge 1) and an "External" number of 9500 (which is the sum of the "Allocation" entries for bridges 2, 3 and 4). All other bridges in the bridge group are configured in a similar fashion.

Figure 6:
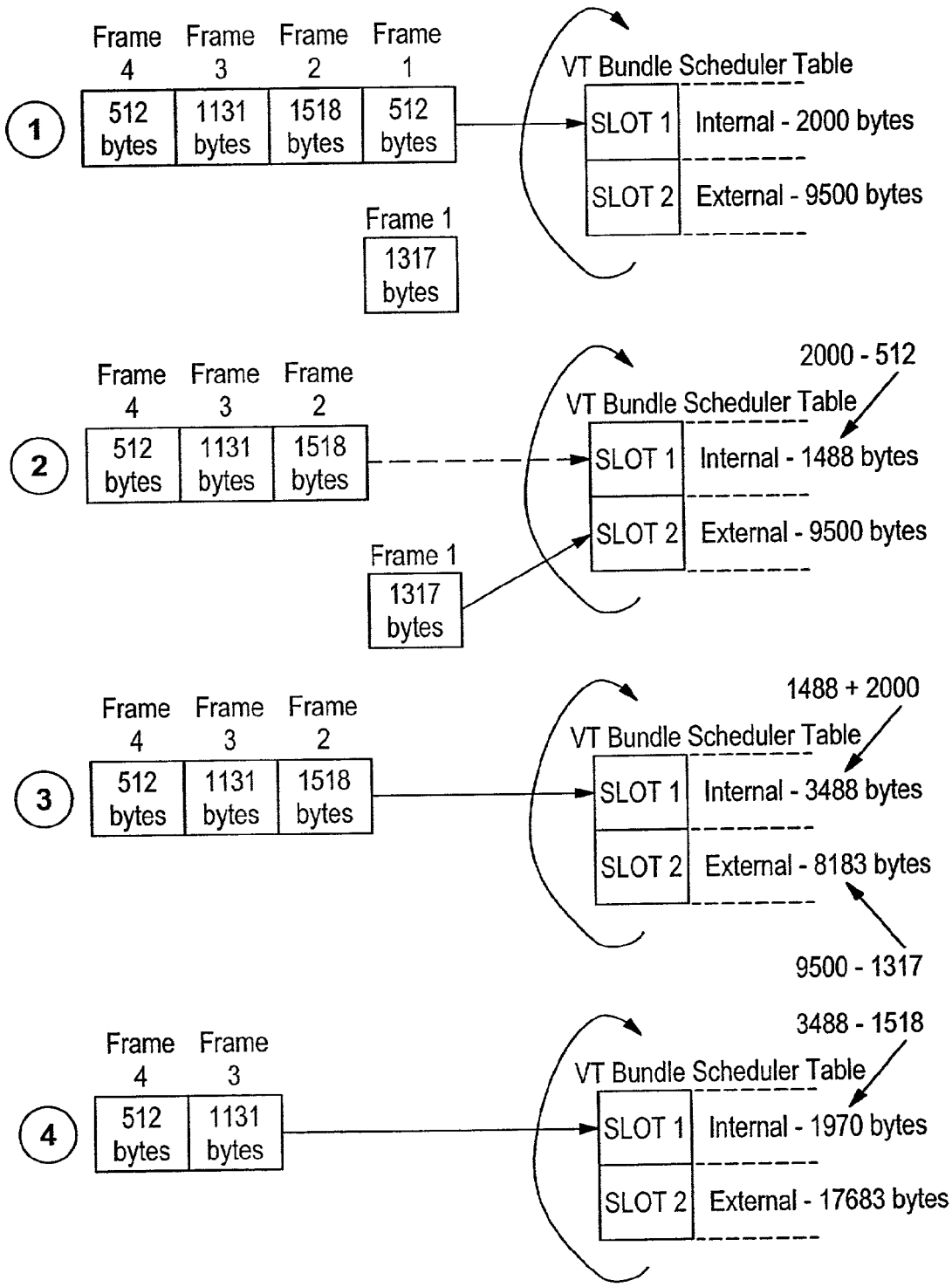
FIG. 6 illustrates the use of a single VT bundle and a scheduler to carry data frames of multiple bridges of a bridge group in the shared VT connectivity network of FIG. 5.

FIG. 6 shows an example of the operation of a scheduler at bridge 1. It is assumed that bridge 1 initially has four "Internal" frames ready for transmission, of sizes 512, 1518, 1131, and 512 bytes respectively. Also, one "External" frame of size 1317 bytes has been received and requires forwarding in the ring 16.

The scheduler compares the size of "Internal" frame 1 to the value in slot 1. In this case, the allocation exceeds the size of the frame, so the frame is transmitted. The count in slot 1 is then decremented by the number of bytes in the frame. In this case, the count is decremented by 512 to 1488.

The scheduler then compares the size of "Internal" frame 2 to the count in slot 1. In this case, the allocation is insufficient, so frame 2 cannot be transmitted yet. The scheduler thus proceeds to the "External" frames and slot 2. Because the allocation of 9500 bytes is greater than the size of "External" frame 1, this frame is transmitted and the byte count is decremented by 1317 to 8183. There are no additional "External" frames to be sent.

At this point, the scheduler has made one complete pass through all the slots, so slot 1 is incremented by 2000 to 3488. Now, there is sufficient allocation for the 1518-byte "Internal" frame 2, so this frame is transmitted and the count for slot 1 is decremented to 1970. Subsequently, it will be possible for the remaining "Internal" frames 3 and 4 to be sent before the scheduler moves to slot 2. This process repeats indefinitely. If there are no frames to be sent during one complete pass of the scheduler, the slot byte counts are not incremented.

Figure 7:
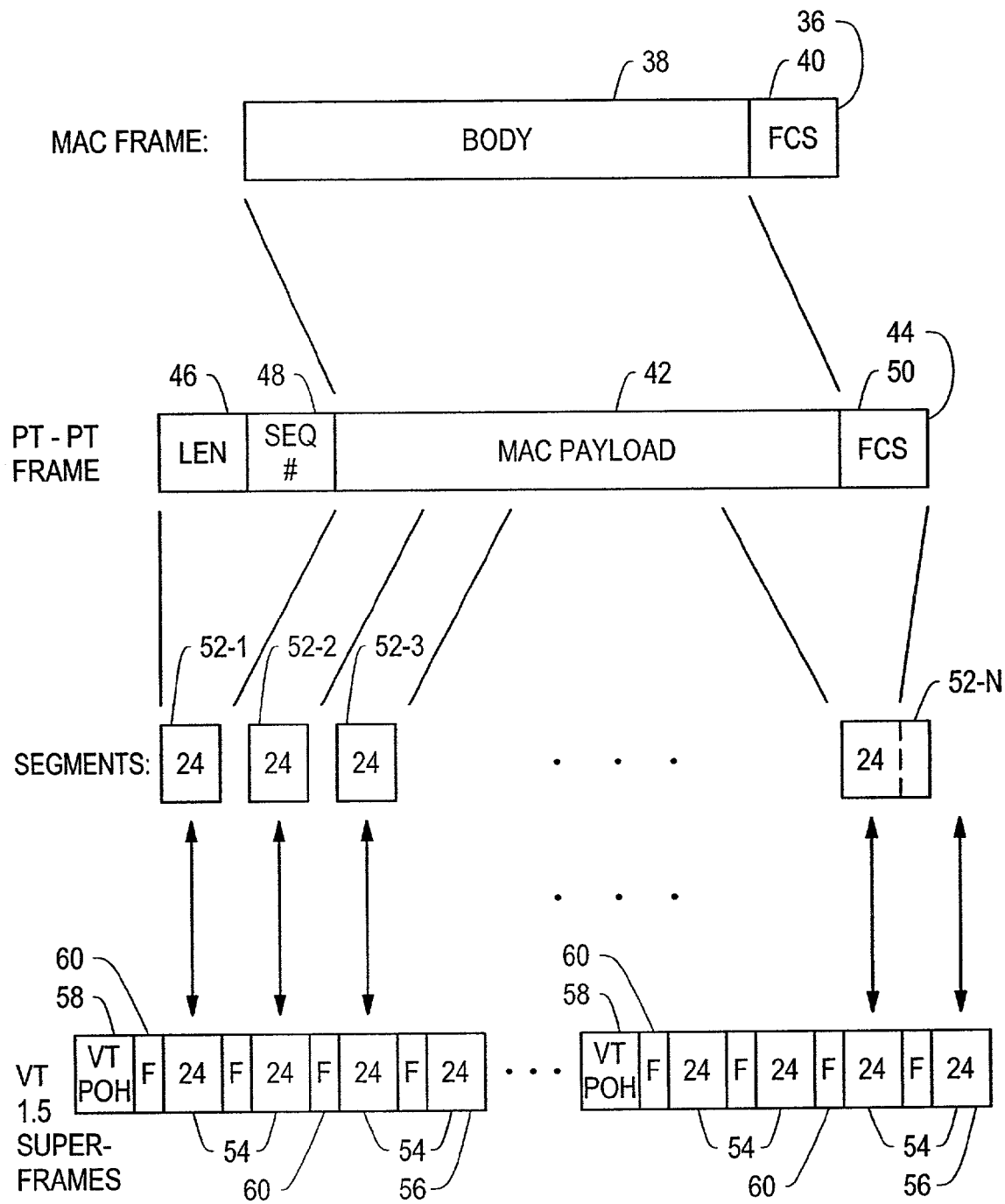
FIG. 7 is a diagram illustrating a technique by which data frames are encapsulated and segmented into multiple VT payloads for transmission in the networks of FIGS. 1, 4 or 5.

FIG. 7 illustrates a mapping between MAC frames and VT payloads that is used for transport in the ring 16.

The MAC frame 36 is shown as having a body 38 and a MAC frame check sequence (FCS) 40, where the body 38 includes several fields (not shown in FIG. 7) such as source address, destination address, length, etc. as is known in the art.

The body 38 of the MAC frame 36 is encapsulated as a "MAC payload" 42 of a point-to-point (PT-PT) frame 44 used as an intermediate message unit in the system of FIG. 1. Due to the use of VT payload structuring to identify traffic, the PT-PT frame 44 requires no additional addressing. The PT-PT frame 44 includes a small amount of additional overhead in the form of a two-byte length field 46, a two-byte sequence number field 48, and a two-byte PT-PT FCS 50. The length field 46 specifies the length of the MAC payload 42 only, because the sequence number field 48 and PT-PT FCS field 50 have fixed sizes.

The PT-PT frame 44 is segmented into 24-byte segments 52-1 through 52-N. As indicated by the dotted line in segment 52-N, the last segment may be only partially full, owing to the variable size of the MAC payload 42; such segments are padded out to 24 bytes.

Different schemes of distributing the segments 52 to particular VTs of a bundle and/or particular containers within a VT can be used. Different VTs of a bundle can be thought of as different channels within the SONET ring 16. One general approach is to distribute fixed-size groups of segments 52 across all VTs of the bundle. Thus, if there are 3 VTs in a bundle, for example, each PT-PT frame 44 is transmitted in 3-segment pieces in successive time slots of all three VTs. For example, segments 1–3 are sent in time slot 1 of all three VTs, segments 4–6 are sent in time slot 2, etc. Another general approach is to send each PT-PT frame 44 via a single VT of the bundle, using as many successive time slots as there are segments 52 of the frame, and to dynamically distribute different frames among the different VTs of the bundle. One arrangement that uses such an approach is described in detail below.

The segments 52 are incorporated as 24-byte payloads in respective VT SPEs for transmission in the ring 16. In the illustrated embodiment, each segment 52 is incorporated as a 24-byte payload 54 within a four-payload superstructure referred to as a VT 1.5 "superframe" 56. In a VT superframe, several VT path overhead (POH) bytes 58 are common to a group of four VT SPEs. That is, these bytes are sent only once for each group of four VT SPEs. Each VT superframe 56 carries a single set of VT POH 58, four payloads 54 and four framing (F) bytes 60.

The framing bytes 60 are used to demarcate each PT-PT frame 44 in the stream of VT payloads 54 carried by a stream of VT superframes 56. In particular, each framing byte 60 can be one of three values as follows: (1) Start of Frame (SOF), appearing with the VT payload 54 carrying the first segment 52-1 of a PT-PT frame 44; (2) Continuation of Frame (COF), appearing with the VT payloads 54 carrying the second segment 52-2 through the next-to-last segment 52-(N−1) of a PT-PT frame 44; and (3) End of Frame (EOF), appearing with the VT payload 54 carrying the last segment 52-N of a PT-PT frame 44.

The beginning of each PT-PT frame 44 is aligned with the beginning of an SOF VT payload 54. The location of the last byte of the PT-PT frame 44 in the EOF VT payload 54 is determined by adding 6 (the total number of bytes in the length field 46, the sequence number field 48, and the PT-PT FCS field 50) to the value in the length field 46, modulo 24. As shown, a single VT superframe 56 may include the last segment 52-N of one PT-PT frame 44 and the first segment of the next PT-PT frame 44. The transition between separate PT-PT frames 44 within a VT superframe 56 is indicated by the pattern of (EOF) (SOF) in two successive F bytes 60.

Figure 8:
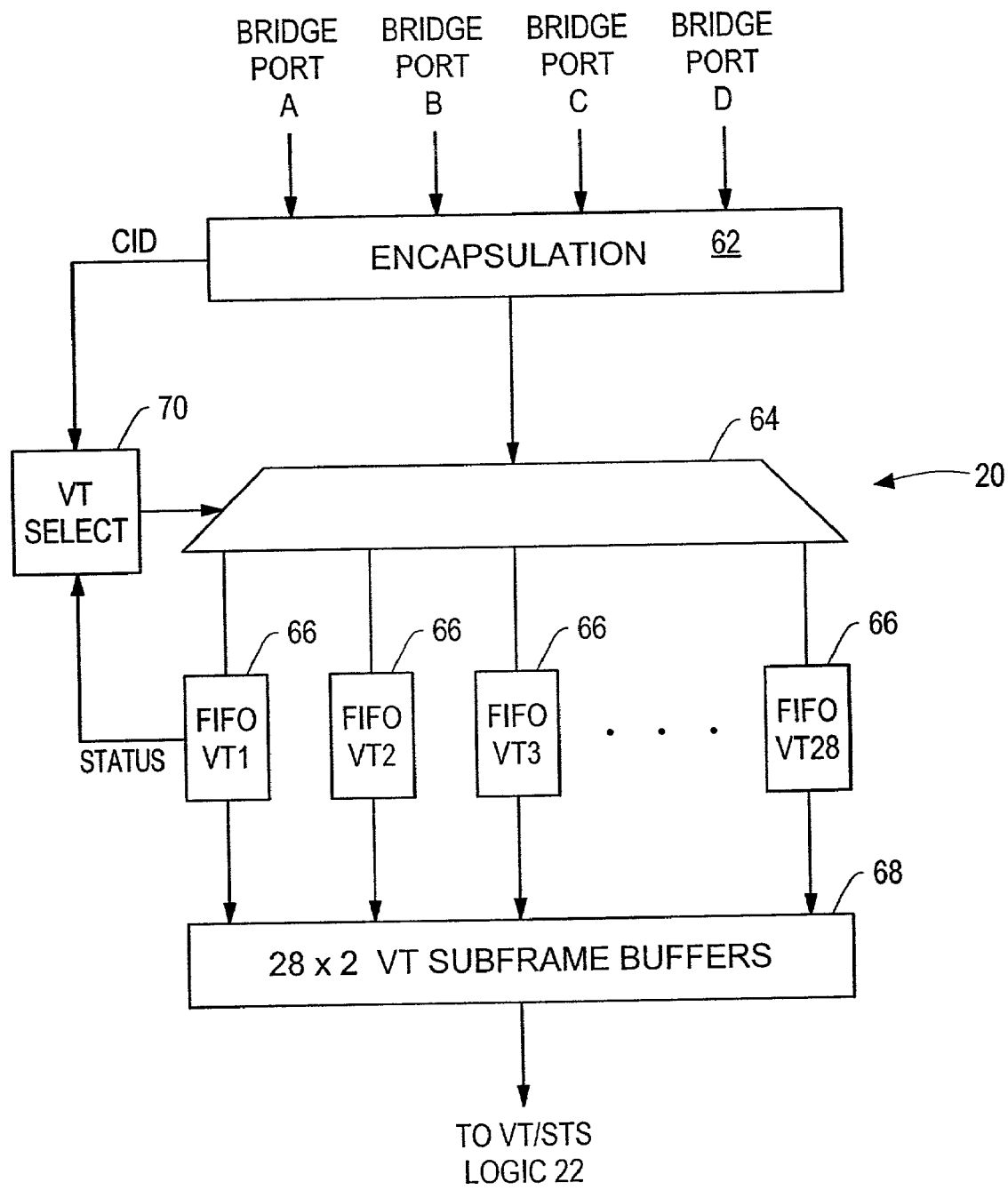
FIG. 8 is a block diagram of logic for encapsulation and segmentation of data frames and distribution of data frame segments among available VTs in the networks of FIGS. 1, 4 or 5.

FIG. 8 shows the structure of the portion of the ENCAP/SAR logic 20 responsible for encapsulating MAC frames 36 in PT-PT frames 44, segmenting the PT-PT frames 44 into segments 52, and providing the segments 52 to the VT/STS logic 22 of FIG. 5. The portion of the ENCAP/SAR logic 20 that accepts received segments 52 and delivers de-capsulated MAC frames 36 to the bridges 10 is described below with reference to FIG. 10.

Encapsulation logic 62 receives MAC frames 36 (FIG. 7) from the local bridge(s) over corresponding ports, such as the four ports labeled A, B, C and D in FIG. 8. For each MAC frame 36, the encapsulation logic 62 calculates its length, a sequence number, and an FCS value, and generates the PT-PT frame 44 using these calculated values and the body 38 of the MAC frame 36. For generating the sequence number, the encapsulation logic 62 maintains four separate counters, each being used to provide sequence numbers for a corresponding bridge port. Each counter is incremented for each PT-PT frame 44 generated for the corresponding bridge port.

Each PT-PT frame 44 generated by the encapsulation logic 62 is provided to demultiplexing logic 64 for distribution to one of twenty-eight VT FIFO buffers 66, each associated with a single VT. The VT FIFO buffers 66 feed twenty-eight pairs of VT subframe buffers 68, which provide VT subframes synchronously to the VT/STS logic 22 (FIG. 2). For each VT, one buffer of the corresponding pair of subframe buffers 68 is being filled from the corresponding VT FIFO buffer 66 (assuming it contains a segment 52 to send) while the other buffer of the pair is being read and the data is being provided to the VT/STS logic 22 for inclusion in an outgoing STS-1 frame. After each concurrent filling and reading operation is completed, the operation of the buffers switches—i.e., the newly emptied buffer is filled with the next segment 52 from the corresponding VT FIFO buffer 66 and the newly filled buffer is read and the data is provided to the VT STS logic 22 for inclusion in the next STS-1 frame. Because of this alternating characteristic of their operation, the VT FIFO buffers 66 are also referred to as "ping-pong" buffers.

The demultiplexing logic 64 is controlled by VT selection logic 70, which receives buffer status information from the VT FIFO buffers 66 and a 2-bit connection identifier (CID) from the encapsulation logic 62. The buffer status information indicates the level of fullness of each VT FIFO buffer 66. The CID identifies the bridge port (A, B, C or D) from which each MAC frame 36 is received, and therefore indirectly identifies the VT bundle that is to be used to carry each PT-PT frame 44. The indirection arises from the preferred use of a configurable table (not shown) that associates each bridge port with a corresponding VT bundle. The use of such a table provides desirable flexibility in the allocation and use of VTs and VT bundles. Although generally less desirable, it is possible in alternative embodiments to establish a fixed association between the bridge ports and VT bundles.

In the illustrated embodiment, the FIFO buffers 66 co-reside in a single 2 MB memory. When all 28 VTs are used, this memory can simply be divided into 28 equal-sized pieces, each of which is used to implement a FIFO buffer 66 for a corresponding VT. If fewer VTs are used, it is possible to allocate more memory to each VT. In alternative embodiments, more or less total memory may be used for the VT FIFO buffers 66.

The VT selection logic 70 distributes encapsulated frames 44 among the VT FIFO buffers 66 in a load-balancing manner in order to minimize the amount of buffering required to re-order the frames 44 at the receiver. Out-of-order delivery arises from the variable-sized nature of the PT-PT frames 44. When a long PT-PT frame 44 is loaded into a VT FIFO buffer 66 and transmitted over several time slots of the corresponding VT, a later-created PT-PT frame 44 may be loaded into a separate VT FIFO buffer 66 and transmitted in a much shorter period of time. This later-created PT-PT frame 44 is completely received at the next network node before the earlier, longer PT-PT frame 44 is completely received. As described below, the sequence numbers 48 are used to correctly re-order the PT-PT frames 44 at a receiving node. However, it is desirable to minimize the average time interval between two successive packets, to thereby reduce the amount of buffering required to accomplish re-ordering at the receiver. This is accomplished by distributing the outgoing PT-PT-frames 44 among the VT buffers 66 in a balanced fashion.

Figure 9:
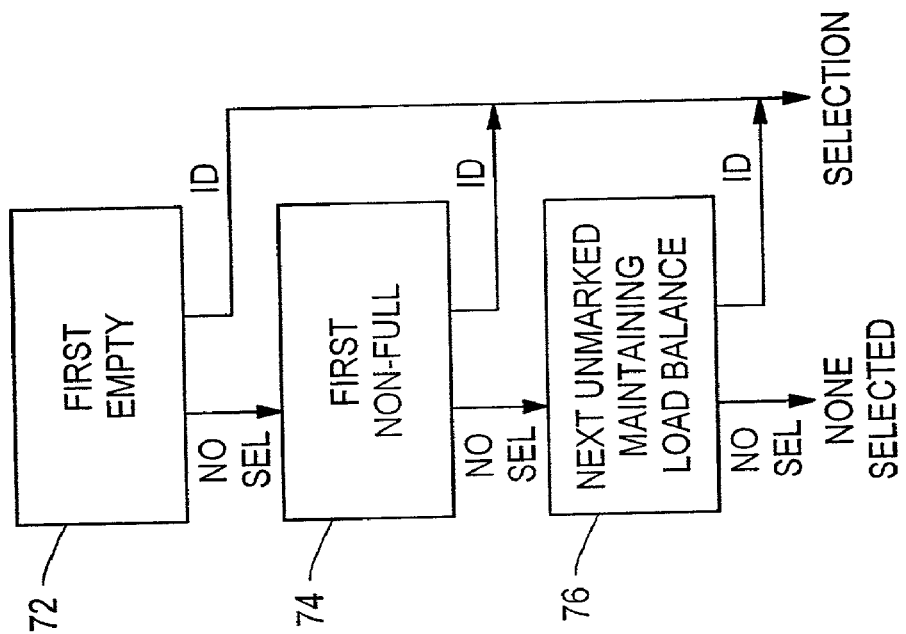
FIG. 9 is a flow diagram of a process for selecting from among the VTs of a VT bundle to carry data frames in the logic of FIG. 8.

FIG. 9 shows the selection process employed by the VT selection logic 70 of FIG. 8 for PT-PT frames 44 destined for a given VT bundle. This process is generally replicated in some fashion for all VT bundles in use at a given time. For example, there may be four separate instances of logic implementing this process within the VT selection logic 70. Alternatively, it may be desirable to use a single instance of such logic with variable input parameters so that it can be used for the frames of the different VT bundles.

It is assumed that the VTs have been ordered in some fashion so that a single VT is selected at any stage of the process even if multiple VTs satisfy a criterion of interest. This ordering can be referred to as a "priority" ordering. For example, it can be assumed without loss of generality that the VTs are priority-ordered by their respective VT numbers, i.e., VT #1 has highest priority, followed by VT #2, VT #3, etc. In this case, it happens that "higher priority" corresponds to "lower VT number". In general, the set of VTs assigned to a given bundle may be non-contiguous. In the bundling scheme of FIG. 3, for example, every other VT is missing from VT bundle 30-1. Thus, in the following description, when a "first" or "next" VT is referred to, this is to be understood as a search among only those VTs actually assigned to a bundle. If there is a search for the next VT after VT #5 in bundle 30-1, for example, the first possible candidate is VT #7, which is the next-lower-priority VT assigned to bundle 30-1.

In step 72 of FIG. 9, the VT selection logic 70 searches for the "first", or highest-priority, VT in the bundle whose FIFO 66 is empty. If one or more FIFOs 66 are empty, then the first of these (i.e., the lowest-numbered) is selected. An identifier (ID) of the selected VT is used as the selection input to the demultiplexer 64. For example, if VTs #3, #17, and #24 are all assigned to the bundle and empty, then the FIFO 66 for VT #3 is selected.

If none of the FIFOs 66 of the VTs assigned to the bundle is empty, then in step 74 the VT selection logic 70 searches for the first VT of the bundle whose FIFO 66 is not full. This assumes that at least one FIFO 66 is full. Assuming that this condition is met, then if there are also one or more non-full FIFOs 66, the ID of the lowest-numbered VT having such a non-full FIFO 66 is used as the selection input to the demultiplexer 64. For purposes of determining a buffer's fullness, a mark set at a predetermined point from the top of the FIFO can be used. For example, a buffer may be deemed full when it has less than 2 KB of free space.

If all of the VTs assigned to the bundle are neither empty nor full, then in step 76 the VT selection logic 70 looks for the next VT assigned to the bundle whose FIFO 66 satisfies a load-balancing criterion. The starting point for determining the next VT begins where a preceding selection left off. This operation is referred to as "semi-round-robin" selection. Although the basic selection mechanism is round-robin selection, the selection may be modified when the load-balancing criterion is applied. A mark register (not shown) is used to keep track of the VTs that have been previously selected in the semi-round-robin manner. At any given time, the first unmarked VT has the highest priority, and a search for the next VT may wrap around from VT #28 back to VT #1. For example, if assigned VTs in the range of #5 through #15 are marked, then the VTs are ordered (#16, #17, . . . , #28, #1, #2, #3, #4) for purposes of step 76. The mark register is reset to all zeros upon all VTs becoming marked.

A load balancing criterion is used in step 76 so that frames are distributed evenly among the available VTs, as described above. The level of fullness of each FIFO buffer 66 is tracked, and new selections are made such that the difference in fullness between the fullest and emptiest FIFO buffers 66 is less than some predetermined amount. A useful value for this parameter is 2 kilobytes, for example. In such a case, the first VT whose selection does not result in a fullness difference of more than 2 Kb across all the FIFO buffers 66 is selected.

Figure 10:
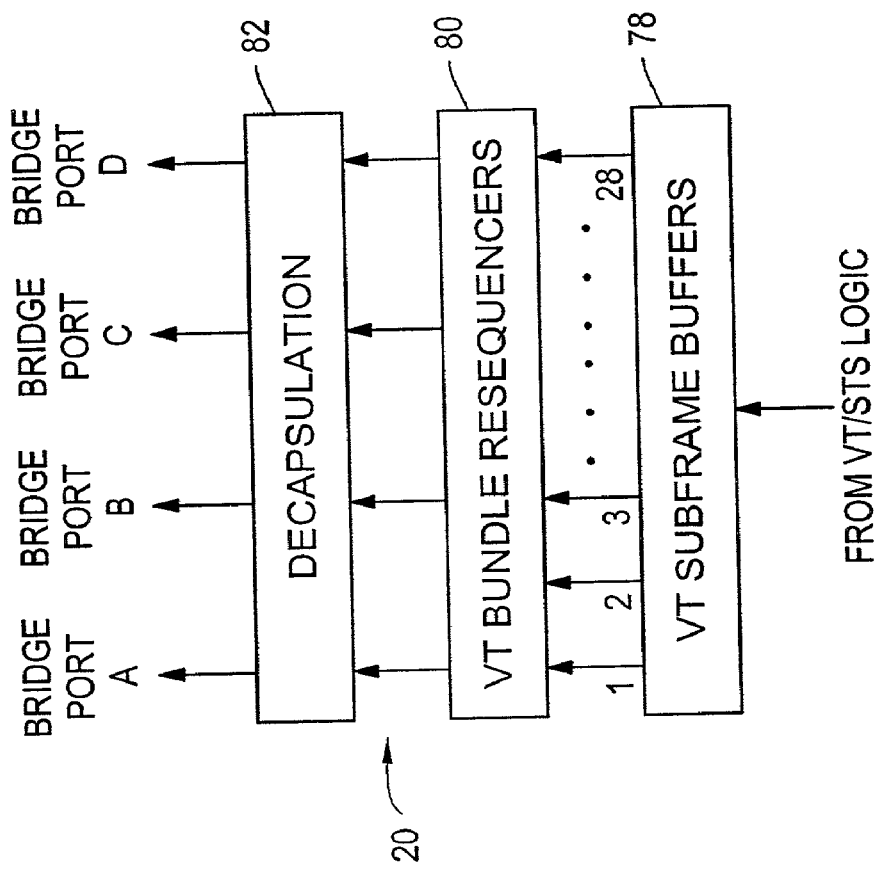
FIG. 10 is a block diagram of logic for receiving, re-sequencing, and de-capsulating encapsulated frames in the network of FIGS. 1, 4 or 5.

FIG. 10 shows the logic within the ENCAP/SAR logic 20 responsible for receiving VT segments 52 from the ring 16 and re-creating the originally transmitted MAC frames 36. Twenty-eight sets of paired VT subframe buffers 78 work in a manner analogous to that of the subframe buffers 68 of FIG. 8. That is, one buffer in each pair is being filled by the VT/STS logic 22 while the other buffer is being read out for further processing, and when one filling/reading operation is complete, the operation of the buffers switches.

The segments 52 from the subframe buffers 78 are received by a set of VT bundle resequencers 80. The resequencers 80 identify the PT-PT frames 44 within the stream of segments 52 from the VT subframe buffers 78 and perform error checking using the PT-PT FCS 50. The main function of the resequencers 80, however, is to re-order received PT-PT frames 44 as necessary to obtain the sequences as originally emitted by the encapsulation logic 62 of the transmitting node. One resequencer 80 is required for each VT bundle. There should be a sufficient number of resequencers 80 to handle the maximum number of VT bundles that may be employed. For example, if in a given embodiment up to ten VT bundles may be defined, then ten resequencers 80 should be included in the set of resequencers 80. If fewer than ten VT bundles are actually configured in a given application, a corresponding number of resequencers 80 will be active and the remaining number will be idle. To the extent that the definitions of the VT bundles (i.e., the identities of the VTs included in each VT bundle) are configurable, then the resequencers 80 must be similarly configurable so as to operate on the correct sets of VTs.

Each resequencer 80 preferably operates using a "sliding window" algorithm. Each resequencer 80 maintains maximum and minimum values identifying a range, or "window", of sequence numbers within which it is working at any given time, and these values are updated as resequencing operations progress. The size of this window reflects several considerations, notably the expected differences in delay (or dispersion) that PT-PT frames 44 may experience in the network and the amount of buffer storage space available for storing PT-PT frames 44 that are subject to resequencing. Dispersion can result when protection schemes such as unidirectional path-switched ring (UPSR) protection are used, because packets may traverse the ring in different directions and therefore experience different delays. An exemplary window size is 4 milliseconds. The window is generally advanced when a frame is received that either extends a sequence of earlier-received frames or that completes a sequence of earlier-received frames by filling a gap. As an example of the former, if the leading edge of the window has frame number 5 and no other frames have been received, then the leading edge is advanced to frame 6 if that is the next frame received. If the pattern of frames at the leading edge of the window is (10, 11, 13, 14) and frame 12 is received, then the leading edge of the window is advanced to frame 14.

Monitoring circuitry is used to detect when gaps have not been filled in some predetermined time. When this situation occurs, the missing frame(s) are declared to be lost, and the window is advanced as though the gap(s) had been filled. The monitoring circuitry also detects the receipt of a PT-PT frame 44 having a sequence number that falls outside the window. Either of these situations is reported as an error condition to operating software.

The resequencers 80 provide the re-ordered streams of PT-PT frames 44 to decapsulation logic 82, which extracts the MAC payloads 42 from the PT-PT frames 44, re-generates the MAC FCS 40 for each MAC payload 42, and re-generates the MAC frames 36 from the extracted MAC payloads 42 and the re-generated MAC FCS 40. The re-generated MAC frames 36 are then provided to the respective bridge ports.

As previously mentioned, when the shared VT connectivity model is employed, the identity(s) of the destination bridge(s) for frames being carried in the ring 16 cannot be determined solely from the identity of the VT bundle carrying the frame. One method of performing the "drop and continue" function is to completely re-construct the original MAC frame 36 and employ MAC-layer logic. An example of this method is described above with reference to FIG. 2 and the forwarding/filtering logic 28. It may be desirable in alternative embodiments to perform this function at the level of the PT-PT frames 44, so as to reduce delays by bypassing MAC-layer processing when possible. Additional information may be appended to each PT-PT frame 44 to enable such functionality. Specifically, a short field for identifying the destination bridge 10 may be included. By examining this field, a node receiving a PT-PT frame 44 can quickly determine whether the frame is to be sent further in the ring 16. Information identifying whether a frame is unicast or multicast may also be used to enable a quick determination whether a frame is to be dropped locally in addition to being continued. Additionally, it may be useful to include a field identifying the source bridge 10 to enable "learning" of associations between MAC addresses and bridges 10 at each node. Additional useful information might include service type, such as "guaranteed" or "best effort", which would be used in managing the flow of different classes of traffic.

It will be apparent to those skilled in the art that other modifications to and variations of the disclosed system are possible without departing from the inventive concepts disclosed herein, and therefore the invention should not be viewed as limited except to the full scope and spirit of the appended claims.

What is claimed is:

1. A meted of transferring variable-length data frames across a synchronous network employing a multiple-channel synchronous transport signal to carry data among nodes of the network, wherein each channel of the synchronous transport signal carries data in fixed-size payloads, comprising:

encapsulating each data frame in a corresponding point-to-point frame, each point-to-point frame including a body portion of the corresponding data frame and a length value, the length value being located at a predetermined position in a beginning portion of the point-to-point frame;

dividing each point-to-point frame into a corresponding set of fixed-sized segments, a first one of the segments of each set carrying the beginning portion of the corresponding point-to-point frame such that the length value is located at a predetermined position in the first segment;

transmitting the segments of each point-to-point frame as a corresponding set of payloads of at least one channel of the synchronous transport signal, each set of payloads being marked so as to be identifiable in a stream of payloads of the at least one channel of the synchronous transport signal;

receiving each set of payloads of the at least one channel of the synchronous transport signal, and from each received set of payloads regenerating the corresponding point-to-point flame based at least in part on the length value from the first segment; and de-capsulating each regenerated point-to-point frame to recover the corresponding data frame.

2. A method according to claim 1, wherein the segments of the point-to-point frames are transmitted as corresponding sets of payloads of at least two channels of the synchronous transport signal, but the segments of each point-to-point frame are transmitted in payloads of only a single one of the at least two channels.

3. A method according to claim 2, wherein each point-to-point frame also includes a sequence number identifying its temporal position among the point-to-point frames carrying the data frames, and further comprising re-ordering the point-to-point frames regenerated from the received sets of payloads based on the respective sequence numbers so as to recover the data frames according to an original ordering.

4. A method according to claim 2, further comprising selecting which of the at least two channels of the synchronous transport signal is to carry each point-to-point frame based on channel load balancing criteria.

5. A method according to claim 4, wherein each channel has associated therewith a corresponding buffer for temporarily storing point-to-point frames to be transmitted via the channels of the synchronous transport signal, and wherein the load balancing criteria includes maintaining no more than a predetermined difference in the fullness of the buffers.

6. A method according to claim 1, wherein the payloads of each channel of the synchronous transport signal are arranged into multi-payload superframes, each superframe including overhead information common to all payloads of the superframe.

7. A method according to claim 6, wherein a superframe is permitted to include a payload containing the end of one point-to-point frame and a payload containing the beginning of another point-to-point frame.

8. A method according to claim 1, wherein each set of payloads includes a payload marked as an end of frame payload, and wherein regenerating the point-to-point frame from a set of payloads includes determining, using the length value, a precise location within the segment carried by the end of frame payload at which the point-to-point frame ends.

9. A method according to claim 1, wherein the at least one channel is one channel in a first of multiple bundles of channels, the bundles being associated with different sets of users of the synchronous network.

10. A method according to claim 9, wherein the payloads in the channels of all the bundles are the same size.

11. A method according to claim 9, wherein each bundle is associated with a corresponding specific user within the set of users associated with the bundle, and wherein each point-to-point frame transmitted by a user is transmitted on the associated bundle and multicast to all other users of the associated set of users.

12. A method according to claim 11, wherein each point-to-point frame transmitted via the bundles of channels is dropped and continued within the synchronous network based on the identity of bundle.

13. A method according to claim 9, wherein the use of the bundle of channels is shared by all users in the set of users associated with the bundle.

14. A method according to claim 13, wherein the transmission of point-to-point frames on an associated bundle of channels is controlled by a scheduling process that allocates the use of each bundle among the associated set of users according to a predetermined bandwidth allocation scheme.

15. A method according to claim 14, wherein each point-to-point frame transmitted via the bundles of channels is dropped and re-transmitted within the synchronous network based on information within the point-to-point frame identifying a destination of the point-to-point frame within the network.

16. A method according to claim 15, wherein the destination information is destination information appearing in the data frame encapsulated within the point-to-point frame.

17. A method according to claim 15, wherein the destination information included in each point-to-point frame is generated from separate destination information included in the data frame encapsulated by the point-to-point frame.

18. A network device for transferring variable-length data frames across a synchronous network employing a multiple-channel synchronous transport signal to carry data among nodes of the network, wherein each channel of the synchronous transport signal carries data in fixed-size payloads, comprising:
- encapsulation logic operative to encapsulate each data frame in a corresponding point-to-point frame, each point-to-point frame including a body portion of the corresponding data frame and a length value, the length value being located at a predetermined position in a beginning portion of the point-to-point frame;
- segmentation logic operative to divide each point-to-point frame into a corresponding set of fixed-sized segments, a first one of the segments of each set carrying the beginning portion of the corresponding point-to-point frame such that the length value is located at a predetermined position in the first segment;
- transmitting circuitry operative to transmit the segments of each point-to-point frame as a corresponding set of payloads of at least one channel of the synchronous transport signal, each set of payloads being marked so as to be identifiable in a stream of payloads of the at least one channel of the synchronous transport signal;
- receiving circuitry operative to (i) receive sets of payloads of at least another channel of the synchronous transport signal, and (ii) from each received set of payloads, regenerate a corresponding point-to-point frame based at least in part on a length value from a first segment thereof; and
- de-capsulation logic operative to de-capsulate each regenerated point-to-point frame to recover the corresponding data frame.

19. A network device according to claim 18, wherein the encapsulation logic is further operative to include a sequence number with each point-to-point frame, the sequence number identifying the temporal position of the point-to-point frame among the point-to-point frames carrying the data frames, and further comprising re-sequencing logic operative to re-order the point-to-point frames regenerated from the received sets of payloads based on the respective sequence numbers so as to recover the data frames according to an original ordering.

20. A network device according to claim 18, further comprising selection logic operative to select which of the at least two channels of the synchronous transport signal is to carry each point-to-point frame based on channel load balancing criteria.

21. A network device according to claim 20, further comprising buffers associated with respective ones of the channels for temporarily storing point-to-point frames to be transmittal via the associated channels, each buffer providing information regarding its relative fullness, and wherein the load balancing criteria used by the selection logic includes maintaining no more than a predetermined difference in the fullness of the buffers.

22. A network device according to claim 18, wherein the payloads of each channel of the synchronous transport signal are arranged into multi-payload superframes, each superframe including overhead information common to all payloads of the superframe.

23. A network device according to claim 22, wherein a superframe is permitted to include a payload containing the end of one point-to-point frame and a separate payload containing the beginning of another point-to-point frame.

24. A network device according to claim 18, wherein each set of payloads includes a payload marked as an end of frame payload, and wherein the receiving circuitry is further operative to determine, using the length value of each received point-to-point frame, a precise location within the segment carried by the end of frame payload at which the point-to-point frame ends.

25. A network device according to claim 18, wherein the at least one channel is one channel in a first of multiple bundles of channels, the bundles being associated with different sets of users of the synchronous network.

26. A network device according to claim 25, wherein the payloads in the channels of all the bundles are the same size.

27. A network device according to claim 25, wherein each bundle is associated with a corresponding specific user within the set of users associated with the bundle, and wherein each point-to-point frame transmitted by a user is transmitted on the associated bundle and multicast to all other users of the associated set of users.

28. A network device according to claim 27, wherein each point-to-point frame transmitted via the bundles of channels is dropped and forwarded within the synchronous network based on the identity of bundle.

29. A network device according to claim 25, wherein the use of the bundle of channels is shared by all users in the set of users associated with the bundle.

30. A network device according to claim 29, wherein the transmission of point-to-point frames on an associated bundle of channels is controlled by a scheduling process that allocates the use of each bundle among the associated set of users according to a predetermined bandwidth allocation scheme.

31. A network device according to claim 30, wherein each point-to-point frame transmitted via the bundles of channels is dropped and forwarded within the synchronous network based on information within the point-to-point frame identifying a destination of the point-to-point frame within the network.

32. A network device according to claim 31, wherein the destination information is destination information appearing in the data frame encapsulated within the point-to-point frame.

33. A network device according to claim 31, wherein the destination information included in each point-to-point frame is generated from separate destination information included in the data flame encapsulated by the point-to-point frame.

* * * * *

UNITED STATES PATENT AND TRADEMARK OFFICE
CERTIFICATE OF CORRECTION

PATENT NO. : 6,982,989 B2  
APPLICATION NO. : 09/878723  
DATED : January 3, 2006  
INVENTOR(S) : Jae Park et al.

Page 1 of 1

It is certified that error appears in the above-identified patent and that said Letters Patent is hereby corrected as shown below:

Column 15, claim 1, line 26, "meted" should read --method--; and

Column 15, claim 1, line 53, "flame" should read --frame--.

Signed and Sealed this

Thirtieth Day of January, 2007

JON W. DUDAS  
*Director of the United States Patent and Trademark Office*